US010350933B2

(12) United States Patent
Firth et al.

(10) Patent No.: US 10,350,933 B2
(45) Date of Patent: Jul. 16, 2019

(54) INK OR TONER COMPOSITIONS, METHODS OF USE, AND PRODUCTS DERIVED THEREFROM

(75) Inventors: Andrea V. Firth, Ottawa (CA); Theodoros Garanzotis, Ottawa (CA)

(73) Assignee: Bank of Canada, Ottawa (CA)

( * ) Notice: Subject to any disclaimer, the term of this patent is extended or adjusted under 35 U.S.C. 154(b) by 376 days.

(21) Appl. No.: 12/602,109

(22) PCT Filed: Jun. 5, 2008

(86) PCT No.: PCT/CA2008/001074
§ 371 (c)(1),
(2), (4) Date: Jan. 11, 2010

(87) PCT Pub. No.: WO2008/148201
PCT Pub. Date: Dec. 11, 2008

(65) Prior Publication Data
US 2010/0140916 A1 Jun. 10, 2010

Related U.S. Application Data

(60) Provisional application No. 60/924,919, filed on Jun. 5, 2007.

(51) Int. Cl.
*B42D 25/369* (2014.01)
*B42D 25/378* (2014.01)
*B42D 25/29* (2014.01)
*C09C 1/24* (2006.01)
*C09C 1/22* (2006.01)
*B82Y 30/00* (2011.01)
*C09C 1/62* (2006.01)
*C09D 5/36* (2006.01)
*C09D 11/037* (2014.01)
*G03G 9/093* (2006.01)
*B41M 3/14* (2006.01)

(52) U.S. Cl.
CPC ......... *B42D 25/369* (2014.10); *B42D 25/29* (2014.10); *B42D 25/378* (2014.10); *B82Y 30/00* (2013.01); *C09C 1/22* (2013.01); *C09C 1/24* (2013.01); *C09C 1/62* (2013.01); *C09D 5/36* (2013.01); *C09D 11/037* (2013.01); *G03G 9/09321* (2013.01); *G03G 9/09328* (2013.01); *G03G 9/09385* (2013.01); *B41M 3/14* (2013.01); *B42D 2033/16* (2013.01); *B42D 2033/20* (2013.01); *C01P 2004/61* (2013.01); *C01P 2004/62* (2013.01); *C01P 2004/64* (2013.01); *Y10T 428/25* (2015.01)

(58) Field of Classification Search
CPC ........ B42D 15/00; B42D 15/10; B42D 25/29; B42D 2033/16; B42D 2033/20; C09D 5/36; C09D 11/037; G03G 9/09321; G03G 9/09385; G03G 9/09328; C09C 1/22; C09C 1/62; C09C 1/24; B82Y 30/00; Y10T 428/25; C01P 2004/62; C01P 2004/61; C01P 2004/64; B42M 3/14
USPC ........ 283/67, 70, 72, 74, 82, 83, 84, 94, 98, 283/100, 111; 252/62.55, 62.56, 62.62, 252/62.51 R; 101/491; 427/127, 128, 427/212, 598
See application file for complete search history.

(56) References Cited

U.S. PATENT DOCUMENTS

| | | |
|---|---|---|
| 3,955,295 A | 5/1976 | Mayer |
| 4,211,668 A | 7/1980 | Tate |
| 4,272,596 A | 6/1981 | Harbour et al. |
| 4,443,527 A | 4/1984 | Heikens et al. |
| 4,486,523 A | 12/1984 | Hosfeld et al. |
| 4,623,602 A | 11/1986 | Bakker et al. |
| 4,758,490 A | 7/1988 | Kitabatake |
| 4,795,698 A | 1/1989 | Owen et al. |
| 4,803,143 A | 2/1989 | Ostertag et al. |
| 4,899,037 A * | 2/1990 | Marechal et al. ............ 235/493 |
| 5,002,608 A | 3/1991 | Fujiwara et al. |
| 5,071,724 A | 12/1991 | Goldman |
| 5,135,832 A | 8/1992 | Sacripante et al. |
| 5,145,719 A | 9/1992 | Towata et al. |
| 5,516,153 A | 5/1996 | Kaule |
| 5,599,627 A | 2/1997 | Aoki et al. |
| 5,679,138 A | 10/1997 | Bishop et al. |
| 5,695,901 A | 12/1997 | Selim |

(Continued)

FOREIGN PATENT DOCUMENTS

| | | |
|---|---|---|
| CA | 2041940 | 12/1991 |
| CA | 2594806 | 7/2006 |

(Continued)

OTHER PUBLICATIONS

Patent Abstracts of Japan, 61099145, "Magnetic Color Toner", May 17, 1986, G03G 5/08, Shimamura Masayoshi.

(Continued)

Primary Examiner — Justin V Lewis
(74) Attorney, Agent, or Firm — Banner & Witcoff, Ltd.

(57) ABSTRACT

Magnetic ink and toner compositions traditionally comprise magnetic materials in fine particulate form, either as a dry composition or a liquid suspension. Often such materials are black or dark in color. Disclosed herein are particles compositions suitable for use as inks or toners, that exhibit desirable magnetic properties, and furthermore which include particles coated so they appear white substantially white, or colored. Such compositions present new opportunities for the production of corresponding magnetic layers, when the compositions are deposited in an appropriate manner to a substrate.

29 Claims, No Drawings

(56) References Cited

U.S. PATENT DOCUMENTS

| | | | |
|---|---|---|---|
| 5,858,595 A * | 1/1999 | Ziolo | B82Y 25/00 |
| | | | 106/31.92 |
| 5,945,218 A | 8/1999 | Nakao et al. | |
| 5,985,466 A | 11/1999 | Atarashi et al. | |
| 6,110,633 A | 8/2000 | Atarashi et al. | |
| 6,114,077 A | 9/2000 | Voets et al. | |
| 6,136,083 A | 10/2000 | Schmidt et al. | |
| 6,203,955 B1 | 3/2001 | Mochizuki | |
| 6,248,805 B1 | 6/2001 | Nguyen et al. | |
| 6,310,118 B1 | 10/2001 | Atarashi et al. | |
| 6,343,745 B1 * | 2/2002 | Bohm et al. | 283/84 |
| 6,467,897 B1 | 10/2002 | Wu et al. | |
| 6,517,627 B1 | 2/2003 | Atarashi et al. | |
| 6,538,801 B2 | 3/2003 | Jacobson et al. | |
| 6,565,973 B2 | 5/2003 | Duff et al. | |
| 6,705,874 B1 | 3/2004 | Koyama | |
| 6,743,371 B2 * | 6/2004 | John | H01F 1/447 |
| | | | 252/570 |
| 6,790,542 B2 | 9/2004 | Dean et al. | |
| 6,818,297 B1 | 11/2004 | Atarashi et al. | |
| 6,870,661 B2 | 3/2005 | Pullen et al. | |
| 6,875,522 B2 | 4/2005 | Seto et al. | |
| 7,118,841 B2 | 10/2006 | Iga | |
| 7,169,443 B2 | 1/2007 | Kishimoto et al. | |
| 7,169,471 B1 * | 1/2007 | Dreher | B41M 5/267 |
| | | | 428/402 |
| 7,404,852 B2 | 7/2008 | Ishibashi et al. | |
| 7,452,653 B2 | 11/2008 | Tanaka | |
| 7,566,360 B2 | 7/2009 | Garbar et al. | |
| 2004/0051297 A1 * | 3/2004 | Raksha | B05D 3/207 |
| | | | 283/57 |
| 2005/0142343 A1 | 6/2005 | Winkler et al. | |
| 2005/0208303 A1 | 9/2005 | Atarashi et al. | |
| 2006/0083694 A1 | 4/2006 | Kodas et al. | |
| 2006/0130690 A1 * | 6/2006 | Bieber | B41C 1/10 |
| | | | 101/467 |
| 2006/0137567 A1 | 6/2006 | Yadav | |
| 2006/0198987 A1 | 9/2006 | Grob et al. | |
| 2006/0275606 A1 | 12/2006 | Mizutani | |
| 2007/0024551 A1 | 2/2007 | Gelbman | |
| 2007/0184268 A1 | 8/2007 | Kishimoto et al. | |
| 2007/0241553 A1 * | 10/2007 | Heim et al. | 283/91 |
| 2007/0246931 A1 * | 10/2007 | Hansen et al. | 283/83 |
| 2008/0267851 A1 * | 10/2008 | Sare et al. | 423/327.1 |

FOREIGN PATENT DOCUMENTS

| | | | |
|---|---|---|---|
| CA | 2544493 | 10/2006 | |
| EP | 0 184 714 B1 | 9/1989 | |
| EP | 400556 A1 * | 12/1990 | |
| EP | 0400556 A1 * | 12/1990 | G03G 9/0833 |
| EP | 0 282 329 B1 | 1/1992 | |
| EP | 0 463 412 A1 | 1/1992 | |
| EP | 0 609 897 B2 | 9/1998 | |
| EP | 0 959 107 A1 | 11/1999 | |
| EP | 0 959 108 A1 | 11/1999 | |
| EP | 1 134 704 A1 | 9/2001 | |
| EP | 1 231 500 A2 | 8/2002 | |
| EP | 1 484 365 A1 | 12/2004 | |
| EP | 1614727 A1 * | 1/2006 | C09D 11/101 |
| JP | 52-127598 | 10/1977 | |
| JP | 58025643 | 2/1983 | |
| JP | 58085445 | 5/1983 | |
| JP | 59105652 | 6/1984 | |
| JP | 60026349 | 2/1985 | |
| JP | 60073548 | 4/1985 | |
| JP | 60073549 | 4/1985 | |
| JP | 60086554 | 5/1985 | |
| JP | 60173553 | 9/1985 | |
| JP | 60189760 | 9/1985 | |
| JP | 60260919 | 12/1985 | |
| JP | 61-099145 | 5/1986 | |
| JP | 62070863 | 4/1987 | |
| JP | 63161459 | 7/1988 | |
| JP | 63-222324 | 9/1988 | |
| JP | 63230777 | 9/1988 | |
| JP | 03271376 | 12/1991 | |
| JP | 03274278 | 12/1991 | |
| JP | 04093257 | 3/1992 | |
| JP | 05265380 | 10/1993 | |
| JP | 05294626 | 11/1993 | |
| JP | 05323675 | 12/1993 | |
| JP | 07090310 | 4/1995 | |
| JP | 10-060304 | 3/1998 | |
| JP | 10-060350 | 3/1998 | |
| JP | 10-067503 | 3/1998 | |
| JP | 2000150218 | 5/2000 | |
| JP | 2001-040241 | 2/2001 | |
| JP | 2001-049146 | 2/2001 | |
| JP | 2001-271006 | 10/2001 | |
| JP | 2002148840 | 5/2002 | |
| JP | 2002-179947 | 6/2002 | |
| JP | 3330613 | 9/2002 | |
| JP | 2003002658 | 1/2003 | |
| JP | 2004339388 | 12/2004 | |
| JP | 2005124908 | 5/2005 | |
| JP | 2006274214 | 10/2006 | |
| JP | 2006307198 | 11/2006 | |
| WO | WO 90/15364 A1 | 12/1990 | |
| WO | WO 91/04516 A1 | 4/1991 | |
| WO | WO 95/04279 A1 | 2/1995 | |
| WO | WO 99/01766 A1 | 1/1999 | |
| WO | WO 01/17667 A1 | 3/2001 | |
| WO | WO 02/09125 A1 | 1/2002 | |
| WO | WO 03/038002 A1 | 5/2003 | |
| WO | WO 03048726 A2 * | 6/2003 | |
| WO | WO 2003/091953 A3 | 11/2003 | |
| WO | WO 2004/050350 A1 | 6/2004 | |
| WO | WO 2003048726 A3 * | 10/2004 | |
| WO | WO 2006/076616 A2 | 7/2006 | |
| WO | WO 2006/128639 A1 | 12/2006 | |
| WO | WO 2006/135384 A1 | 12/2006 | |

OTHER PUBLICATIONS

Patent Abstracts of Japan, 03274278, "White Magnetic Powder and Its Production", Dec. 5, 1991, C23C 18/44, Shinko Takashi.

Patent Abstracts of Japan, 03271376, "White Magnetic Powder and Its Production", Dec. 3, 1991, C23C 18/36, Shinko Takashi.

Patent Abstracts of Japan, 07090310, "Powder Having Multilayered Film on Surface and Its Production", Apr. 4, 1995, B22F 1/02, Shinko Takashi.

Patent Abstracts of Japan, 2000150218, "White-Based Magnetic Powder and Its Manufacture", May 30, 2000, H01F 1/11, Sakata Shinichi.

Patent Abstracts of Japan, 05294626, "White Magnetic Powder and Its Production", Nov. 9, 1993, C01G 23/00, Koma Yoshishige.

Patent Abstracts of Japan, 60073548, "Magnetic Microencapsulated Toner", Apr. 25, 1985, G03G 9/08, Sakojiri Hiromichi.

Patent Abstracts of Japan, 2005124908, "Fingerprint Detecting Powder and Fingerprint Detecting Method", May 19, 2005, A61B 5/117, Kishimoto Akira.

Patent Abstracts of Japan, 63230777, "Iron Oxide Pigment Covered with Titanium Dioxide", Sep. 27, 1988, C09C 1/00, Fujiwara Sanji.

Burke, N.A.D., Stöver, H.D.H. and Davson, F.P., (2002), "Magnetic Nanocomposites: Preparation and Characterization of Polymer-coated Iron Nanoparticles", Chemical of Materials, vol. 14, Issue 11, pp. 4752-4761.

Vestal, Christy R. and Zhang, Z. John, (2003), "Synthesis and Magnetic Characterization of Mn and Co Spinel Ferrite-Silica Nanoparticles with Tunable Magnetic Core", Nano Letters, vol. 3, Issue 12, pp. 1739-1743.

Jiles, D.C., (2003), "Recent Advances and future directions in magnetic materials", *Acta Materiallia*, vol. 51, Issue 19, pp. 5907-5939.

Sacanna, S. and Philipse, A.P., (2006), "Preparation and Properties of Monodisperse Latex Spheres with Controlled Magnetic Moment for Field-Induced Colloidal Crystallization and (Dipolar) Chain Formation", Langmuir, vol. 22, No. 24, pp. 10209-10216.

(56) References Cited

OTHER PUBLICATIONS

How is Electronic Ink Made? http://www.answers.com/topic/electronic-ink.
Peterson, Ivars, (1998), "Rethinking Ink", Science News, vol. 153, No. 25, p. 396 http://www.sciencenews.org/pages/pdfs/data/1998/153-25/15325-14.pdf.
Wood, Stephen, Geldart Alison, and Jones, Richard A.L., (2004), "The Social and Economic Challenges of Nanotechnology", Economic and Social Research Council.
Patent Abstracts of Japan, 58025643, "Magnetic Toner", Feb. 15, 1983, G03G 9/08, Mihashi Yasuo.
Patent Abstracts of Japan, 58085445, "Magnetic Toner", May 21, 1983, G03G 9/08, Doi Shinji.
Patent Abstracts of Japan, 60073549, "Magnetic Toner", Apr. 25, 1985, G03G 9/08, Sakojiri Hiromichi.
Patent Abstracts of Japan, 60086554, "Magnetic Color Toner", May 16, 1985, G03G 9/08, Suzuki Akira.
Patent Abstracts of Japan, 60173553, "Magnetic Color Toner", Sep. 6, 1985, G03G 9/08, Suzuki Akira.
Patent Abstracts of Japan, 62070863, "Magnetic Color Toner", Apr. 1, 1987, G03G 9/08, Koizumi Fumio.
Patent Abstracts of Japan, 63161459, "Magnetic Toner Particle for Color", Jul. 5, 1988, G03G 9/08, Noguchi Koji.
Patent Abstracts of Japan, 2003002658, "White Magnetic Powder", Jan. 8, 2003, C01G 49/06, Hayashi Tomio.
Patent Abstracts of Japan, 52127598, "Two Layers Type Filter for Removing Radioactive Iodine", Oct. 26, 1977, G21F 9/02, Taoki Masafumi.
Patent Abstracts of Japan, 04093257, "Ink Jet Recording Method", Mar. 26, 1992, B41J 2/01, Nakamura Hiroto.
Patent Abstracts of Japan, 05265380, "Display System Using Magnetic Ink", Oct. 15, 1993, G09F 9/37, Kunimoto Kanichi.
Patent Abstracts of Japan, 05323675, "Magnetic Material Dispersion Type Carrier, Two-Component Developer for Electrostatic Charge Image Development, and Production of Magnetic Material Dispersion Type Carrier", Dec. 7, 1993, G03G 9/107, Amano Yasuko.
Patent Abstracts of Japan, 59105652, "Toner for Developing Electrostatic Charge Image", Jun. 19, 1984, G03G 9/08, Ban Tsuyako.
Patent Abstracts of Japan, 60026349, "Magnetic Color Toner", Feb. 9, 1985, G03G 9/08, Okado Kenji.
Patent Abstracts of Japan, 60189760, "Magnetic Toner for Color Development and its Manufacture", Sep. 27, 1985, G03G 9/08, Suzuki Akira.
Patent Abstracts of Japan, 60260919, "Method for Printing with Liquid Crystal Capsule", Dec. 24, 1985, G02F 1/133, Tanabe Katsuji.
Patent Abstracts of Japan, 2002148840, "Image Forming Device and Method for Forming Image", May 22, 2002, G03G 5/08, Hashizume Junichiro.
Patent Abstracts of Japan, 2004339388, "Water-Based White Ink Composition and Printed Matter", Dec. 2, 2004, C09D 11/02, Kawatsuji Teruyuki.
Patent Abstracts of Japan, 2006274214, "Preparation Process of White Pigment for Water-Based Inks", Oct. 12, 2006, C09C 3/08, Mizutani Hiroshi.
Patent Abstracts of Japan, 2006307198, "White Pigment for Aqueous Ink and Ink Composition Using the Same", Nov. 9, 2006, C09C 3/06, Mizutani Hiroshi.
Japanese Office Action for Japanese Patent Application No. 2010-510623, dated Oct. 1, 2013 (English summary).
Extended European Search Report for European Patent Application No. EP 08757210.3, completed May 16, 2013.

* cited by examiner

INK OR TONER COMPOSITIONS, METHODS OF USE, AND PRODUCTS DERIVED THEREFROM

CROSS-REFERENCE TO RELATED APPLICATIONS

This application is a national phase filing of international patent application PCT/CA2008/001074 filed Jun. 5, 2008, which claims the priority right of provisional U.S. patent application 60/924,919 filed Jun. 5, 2007.

FIELD OF THE INVENTION

The present invention relates to the field of magnetic pigment, ink and toner compositions, as well as products having pigment, ink or toner printed, or otherwise applied, thereupon or therein.

BACKGROUND TO THE INVENTION

Magnetic compositions for printing are well known in the art. Traditionally, magnetic materials which have suitable magnetic and electrical properties for use in the preparation of inks include finely divided metal powders of iron, nickel, cobalt, chromium dioxide, gamma ferrioxide and ferrites, typically having a particle size in the micron range or higher. In other applications, it may be desirable to deposit particulate magnetic materials (such as toner compositions) to a substrate for the purposes of providing a security feature. For example, some bank notes may include discreet lines or patterns of magnetic material on their surface. A magnetic sensor may then be used to check for the presence of the magnetic material.

Magnetic inks are typically dark or black in color such that they are in themselves ideal only for the production of dark or black images. Such magnetic particles do not allow for the possibility to create pure colours, particularly brighter hues as a result of the inherent dark color of the magnetic material, Over recent years, however, advances have been made in providing toner compositions comprising magnetic materials having a colour or hue other than black. For example, magnetic materials have been developed with one or more coating layers enveloping a core magnetic particle, thereby imparting surface characteristics to the entire structure allowing for the provision of colour. Such coated particulate structures are prepared by initial preparation of the magnetic core followed by subsequent addition of preformed, particulate camouflaging particles to adhere to the core. However, it may be difficult for such a camouflaging layer to form with sufficient thickness to properly obscure the dark or black colour of the magnetic material core. In addition the adhesion of the two layers may not offer sufficient durability.

In other examples, the dark or black colour of the magnetic core may be softened or lightened by admixture of magnetic material, for example in granular form, with other lighter coloured or hued binders, thereby to create a heterogeneous magnetic core composition having an acceptable colour or hue, or at least a colour or hue that is more easily masked by one or more surface coatings. Such particulate materials contain reduced core density of the magnetic material and this can result in a deleterious effect upon the magnetic properties of the particles in addition to still having insufficient colour properties.

Still further alternative methods to mask the colour of magnetic particles are known in the art. In one example, magnetic particulate material may be deposited via a chemical vapour deposition process forming a magnetic thin film structure. The thin film may be subsequently coated with a non-magnetic thin film to visually mask the presence of the internal magnetic thin film. Such layering techniques result in the formation of inks which are relatively costly to produce and still have insufficient colour properties.

One clear indicator that there is a need in the art to develop improved magnetic inks, toners, dyes, or components thereof, which have a colour or hue other than black or other dark colours or hues typical of most magnetic materials is the absence of colour magnetography (reference Handbook of Printed Media, Helmut Kipphan, Springer, 2001). There is a further need in the art to develop lightly coloured or hued magnetic inks, toners, or dyes, including those that are white or substantially white, or coloured that are suitable for direct application to a substrate (e.g. direct printing). White magnetic inks, toners or dyes would also be useful for admixture with other magnetic or non-magnetic inks, toners or dyes to alter the colour, aesthetic, or magnetic qualities thereof. For example, in field of bank note security, such inks, toner, or dyes may permit the incorporation of more sophisticated security features into bank notes, such as complex magnetic signatures, or other magnetic machine readable features that are concealed features not readily visible to the naked eye.

SUMMARY OF THE INVENTION

It is one object of the present invention, at least in selected embodiments, to provide a composition suitable for application to a substrate, to generate a magnetic layer upon or otherwise integrated with the substrate.

It is another object of the present invention, at least in selected embodiments, to provide a method for generating a magnetic layer.

Certain exemplary embodiments provide a composition for application to a substrate, to generate a pigmented magnetic layer upon and/or integral with said substrate, the composition comprising:
 (1) particles each comprising:
  (i) a core consisting essentially of a magnetic material;
  (ii) a coating at least substantially enveloping the core to cause said particles when applied to a substrate to form a pigmented magnetic layer having a Hunter Lab colour scale L-value of at least 50; and
  (iii) optionally one or more additional coatings each disposed between said core and said coating and/or at least substantially enveloping said coating;
 (2) optionally a liquid phase, which if present retains said particles at least partially in suspension; and
 (3) optionally one or more other magnetic or non-magnetic inks or toners.

Certain other exemplary embodiments provide a use of the compositions disclosed herein for generating a pigmented magnetic layer on or integral with a substrate, by depositing the particles to the substrate or substrate material so as to cause the particles to adhere to the substrate, and optionally to one another upon the substrate.

Certain other exemplary embodiments provide a method for generating a pigmented magnetic layer, the method comprising the step of:
 applying a composition as disclosed herein to a substrate, said particles adhering to the substrate or substrate material, and optionally to one another, thereby to form said pigmented magnetic layer.

Certain other exemplary embodiments provide a pigmented magnetic layer produced by deposition of a composition as disclosed herein to a substrate, wherein said particles adhere to the substrate and optionally to one another upon the substrate.

Certain other exemplary embodiments provide an article comprising a substrate and the pigmented magnetic layer as disclosed herein deposited thereto.

Certain other exemplary embodiments provide a security feature for a bank note, the security feature comprising a pigmented magnetic layer as disclosed herein.

Certain other exemplary embodiments provide a composition for application to a substrate, to generate a pigmented magnetic layer upon and/or integral with said substrate, the composition comprising:
  (1) particles each comprising:
    (i) a core consisting essentially of a magnetic material;
    (ii) a coating at least substantially enveloping the core to cause said particles when applied to a substrate to have a colour or hue that is different from that of the magnetic material of the core; and
    (iii) optionally one or more additional coatings each disposed between said core and said coating and/or at least substantially enveloping said coating;
  (2) optionally a liquid phase, which if present retains said particles at least partially in suspension; and
  (3) optionally one or more other magnetic or non-magnetic inks or toners.

Definitions

'Black': refers to a dark colour or hue having a value of 10 or less than 10 on the Hunter Lab Colour Scale with reference to a specified reference standard.

'Coating': refers to any layer that is applied to or otherwise at least partially envelops particles having a magnetic core, thereby to envelope, or substantially cover the particles. A coating may be applied directly to the core of particles, or be applied upon other coating(s) previously applied to the particles, or may even be formed between an existing coating and a core in situ for example by chemical reaction. In selected but not all embodiments, a coating may be sufficiently opaque to substantially mask or substantially obscure a colour or hue of a material located directly beneath the coating, such as for example a surface of the magnetic core.

'Colour'/'coloured'—refers to any colour or hue including black, grey, white, red, orange, yellow, green, blue, purple and shades, variants, or mixtures thereof. Colours include black and white, as well as colours or hues represented within the Hunter Lab Colour Scheme, or upon visual inspection as a result of selective absorption and/or transmittance by a material of certain wavelengths of visible light. Colour perception is typically a factor or human vision, or colour perception by an artificial system such as a computer connected to an optical sensing device.

'Cross-linking': refers to any cross-linking technique that is known in the art, suitable for causing or improving an adherence of particles of a composition of the invention to a substrate. Such cross-linking occur by oxidation techniques, or through the application of electromagnetic radiation such as UV radiation.

'Deposition'/'deposit'/'Application'/'apply': these interchangeable terms refer to any method or means for applying a composition of the invention, or any form of toner or ink, onto or into a substrate or substrate material, so that the composition, toner or ink at least partially adheres to or is at least partially admixed with the substrate or substrate material. Preferably, in accordance with the teachings of the present invention, the deposition or application involves magnetic particles adhering to the substrate or at least a surface layer of the substrate material, and in selected embodiments adherence of the magnetic particles to one another upon the substrate, thereby to form a magnetic layer. The resultant magnetic layer may be upon, substantially upon, or partially within the substrate or substrate material, depending for example upon the absorbency, porosity, or structure (such as a laminate or compound structure) of the substrate material. However, in alternative embodiments 'deposition' or 'application' may further encompass admixture of the magnetic particles with the substrate, substrate material, or surface layers or the substrate. Admixed substrate material and magnetic particles may permit subsequent formation of the magnetic layer via printing, extrusion, or other application of a magnetic particle/substrate material mix. The methods of the invention, and the products of such methods, therefore encompass both direct application of a composition or particles therein to a substrate surface and/or admixing of particles with a substrate material, optionally with subsequent processing. This may even result in the magnetic layer being buried within or otherwise concealed by the substrate material.

'Fixing': refers to inducing or improving a degree of adherence of the ink or toner to a substrate, for example for the purposes of printing. Fixing may involve, at least in selected embodiments, heating the substrate and deposited material, or UV irradiation, or may involve induction of a chemical reaction between the substrate and the material. Other fixing techniques are also known in the art, such as mechanical fixing.

'Hunter Lab Colour Scale': refers to a scheme known in the art for attribution of a degree of colour or hue to a particular substance or material. The scale include parameters for attributing values to a degree of whiteness or blackness, with additional values for individual colours or hues between white and black. An example reference providing more details of the Hunter Lab Colour Scheme includes, but is not limited to, "The Measurement of Appearance" by Richard S. Hunter, published by John Wiley & Sons, Publishers, New York, N.Y.—1975
which is incorporated herein by reference. Information regarding the Hunter Lab Colour Scale may also been retrieved from the Hunter Associates Laboratory Inc, Virginia, USA (www.hunterlab.com).

'Ink': refers to any liquid of any colour, hue or substance suitable for application to a solid substrate to change a colour, hue or other appearance (e.g. reflectance, glossiness etc.) of the solid substrate. Preferably, the ink includes a magnetic particulate material in accordance with the teachings of the present invention. The present definition does not detract from or otherwise replace other definitions that are commonly known in the art. An ink may an emulsion or suspension and may also be clear, transparent, or translucent such as for example stains and varnishes etc.

'Magnetic': refers to a physical property of a material. Representative magnetic or magnetizable materials that can be used include: metals such as cobalt, iron, and nickel; metal alloys such as aluminum, cobalt, copper, iron, lead, magnesium, nickel, tin, zinc, antimony, beryllium, bismuth, cadmium, calcium, manganese, selenium, titanium, tungsten, and vanadium, and mixtures thereof; metal compounds that contain metal oxides such as aluminum oxide, iron oxide, copper oxide, nickel oxide, zinc oxide, titanium oxide, and magnesium oxide; ferrite; and mixtures thereof.

The magnetic material can be of any type of magnetic material, e.g. iron, cobalt, nickel; magnetic alloys such as Ni—Co or Nd—Fe—B; inorganic oxide compounds such as $Fe_2O_3$, $Fe_3O_4$, chromium dioxide $CrO_2$, ferrites $MFe_2O_4$ (with M an ion or a cocktail of ions selected from the group consisting of $Mg^{2+}$, $Ca^{2+}$, $Sr^{2+}$, $Ba^{2+}$, $Mn^{2+}$, $Co^{2+}$, $Fe^{2+}$, $Ni^{2+}$, $Cu^{2+}$, $Zn^{2+}$, etc.), garnets $A_3B_5O_{12}$ (with A=a trivalent rare earth-ion or a cocktail of trivalent rare-earth ions and B an ion or a cocktail of ions selected from the group consisting of $Al^{3+}$, $Cr^{3+}$, $Fe^{3+}$, $Ga^{3+}$, $Bi^{3+}$ etc.), hexaferrites $MFe_{12}O_{19}$ with M selected from the group of divalent ions $Ca^{2+}$, $Sr^{2+}$, $Ba^{2+}$, etc., perovskites, etc. In the context of the present invention, any kind of material may noteworthy be used to confer a particular magnetic property to the particles disclosed herein. Said magnetic property may for instance be: strong (super-) paramagnetism; ferromagnetism; ferrimagnetism; antiferromagnetism; antiferrimagnetism; etc. The material may also be paramagnetic or diamagnetic. The material may be of the soft-magnetic, low-coercivity, medium-coercivity or hard-magnetic type, or it may be laid out for detection by the Barkhausen effect. The magnetic property may furthermore result in remanent magnetism comprised in between zero Oersted up to as high as 10,000 Oersted.

'Magnetic layer': refers to any layer upon or within (i.e. forming a part of) a substrate generated by deposition or application of particles, or a composition of the invention onto the substrate by known deposition or application techniques, or admixture of particles or a composition of the invention with substrate material. The magnetic layer optionally includes substrate material, and may be positioned beneath or on top of substrate layers or other layers in a laminate or compound structure. The magnetic layer typically retains magnetic properties by virtue of the magnetic nature of the particular material from which it is comprised. The magnetic layer may also comprise a single layer of particles to a substrate, or may include multiple layers by virtue of adhesion of particles to one another upon or within the substrate. A magnetic layer may also be formed by admixture of a composition of the invention with a material of the substrate, optionally followed by some form of further processing such as but not limited to deposition, printing or extrusion.

'Substantially black'/'Near black': refers to a dark colour or hue having a value of 30 or less than 30 on the Hunter Lab Colour Scale with reference to a specified reference standard.

'Particle': refers to any particle having a diameter of from 0.1 to 10,000 nm, and comprising (i) a core consisting essentially of a magnetic material, possibly with a minor portion of other materials or impurities; (ii) a coating substantially enveloping the core typically having a colour or hue that is different from that of the material of the core; and (iii) optionally one or more additional coatings each disposed between the core and the coating and/or substantially enveloping the coating. In accordance with the invention, a particle has an average diameter in a nanometer range, preferably from 1 to 1000 nm. However, the size of the particles may be greater than 1000 nm, or less than 1 nm. Regardless of their size, such particles may also be referred to herein as 'nanoparticles'.

'Pigment'—typically refers to any substance having any desired colour or hue, including white or black, or any colour designated on the Hunter Lab Colour Scale. A pigment may alternatively have a colour or hue in other regions of the electromagnetic spectrum beyond visible light, such as ultraviolet or infrared reflectance properties. The optical properties of the pigment (e.g. absorbsion, transmission, emission characteristics) may depend upon the application for the pigment. In certain exemplary embodiments, a pigment may refer to a particulate solid having suitable degree of subdivision for use in paint, enamel, ink or composition to be applied to a substrate in accordance with the teachings of the present invention. In selected embodiments of the invention, the powdered solid is in particle form, the particles having a core comprising a magnetic material, and a coating imparting to the particles the desired colour or hue. The colour or hue of the pigment may be white or substantially white, or may have a more definite colour such as but not limited to:

Blue pigments: cobalt blue, cerulean blue, Alkali Blue Lake, Peacock Blue Lake, Victoria Blue Lake, metal-free Phthalocyanine Blue, Phthalocyanine Blue, Fast Sky Blue, Indanthrene Blue (RS, BC), indigo, etc.

Purple pigments: cobalt purple, manganese purple, Fast Violet B, Methyl Violet Lake, etc.

Green pigments: chrome green, zinc green, chrome oxide, viridian, emerald green, Pigment Green B, Naphthol Green B, Green Gold, Acid Green Lake, Malachite Green Lake, Phthalocyanine Green, etc.

Red pigments: colcothar, red lead, silver vermilion, cadmium red, cadmium mercury red, antimony vermilion, Permanent Red 4R, Para Red, Fire Red, Parachloroorthonitroaniline Red, Lithol Fast Scarlet G, Brilliant Fast Scarlet, Western Vermilion, Brilliant Carmine BS, Permanent Red (F2R, F4R, FRL, FRLL, F4RH), Fast Scarlet VD, Vulcan Fast Rubine B, Lithol Red, Lake Red (C, D), Anthocin B, Brilliant Scarlet G, Lithol Rubine GK, Permanent Red FSR, Brilliant Carmine 6B, Pigment Scarlet 3B, Bordeaux 5B, Toluidine Maroon, Permanent Bordeaux F2K, Helio Bordeaux BL, Bordeaux 10B, BON Maroon Light, BON Maroon Medium, Eosine Lake, Rhodamine Lake B, Rhodamine Lake Y, Alizarine Lake, Thioindigo Red B, Thioindigo Maroon, etc.

Yellow pigments: Naphthol Yellow S, Hansa Yellow (10G, 5G, G), cadmium yellow, yellow iron oxide, yellow ochre, arsenious sulfide, lead cyanamide, calcium plumbate, Hansa Yellow (GR, A, RN, R), Pigment Yellow L, Benzine Yellow (G, GR), Permanent Yellow (NCG), Vulcan Fast Yellow (5G, R), Tartrazine Lake, Quinoline Yellow Lake, Anthracene Yellow BGL, etc. Coloured pigments may be generated by admixing or combining a colour such as those mentioned above with a white substance such as but not limited to a metal oxide or an organic polymer, thereby to generate a substance suitable for producing a coating for application to magnetic core particles. Alternatively, a coloured layer may be applied to a particle so that it resides either beneath a white coating, or on top of white coating, relative to the core material. Any pigment may be used in accordance with the teachings herein, for example to form or as part of a coating material to for a coating on a magnetic core, to form a particle for use in a composition of the present invention.

'Pigmented magnetic layer': refers to any layer formed on a substrate by using a composition comprising particles as disclosed herein, wherein said particles are caused to adhere to the substrate or optionally to one another upon the substrate to form the layer. The layer exhibits magnetic properties, and also has a colour that is often different from a colour of the core material or the particles used to form the layer.

'Preferably': refers to or precedes mention of preferred embodiments of the broadest embodiments of the invention.

'Substantially black'/'Near black': refers to a dark colour or hue having a value of 30 or less than 30 on the Hunter Lab Colour Scale with reference to a specified reference standard.

'Substantially white'/'Near white': refers to a light colour or hue having a value of 70 or more than 70 on the Hunter Lab Colour Scale with reference to a specified reference standard.

'Substrate': refers to any solid or substantially solid material having at least one layer of any texture or configuration, suitable for application thereto of a composition of the invention, for the purposes of applying to the substrate particles to form a magnetic layer upon and/or integral with the substrate. A substrate may comprise any material with any surface modifications or layer construction. For example, the substrate may comprise a material selected from one or more, but not limited to, paper, plastic, metal, metal alloy, wood, glass, resin, and rubber.

'Suspension'—refers to a mixture of a particulate solid matter and a liquid, whereby the particulate solid matter includes at least some particles that remain suspended in the liquid for some time without significantly falling through the liquid under the influence of gravity. Such particles may therefore be supported by virtue or their buoyancy, or other forces imparted by the liquid upon the particles. In any suspension, a portion or even all of the particles may sediment out to the 'bottom' of the suspension under the influence of gravity or other forces. This does not detract from the fact that the mixture is still a suspension.

'Toner': refers to any particulate material, whether of the invention or of the prior art, which includes magnetic properties so that it becomes influenced by a magnetic field, and which is further amenable to deposition upon and at least partial fixing to a substrate for the purposes of printing. A toner may be in dry particulate form, or may include a liquid phase suitable for retaining at least a portion of the particulate material in suspension. The present definition does not detract from or otherwise replace other definitions that are commonly known in the art.

'White': refers to a light colour or hue having a value of 90 or more than 90 on the Hunter Lab Colour Scale with reference to a specified reference standard.

DETAILED DESCRIPTION OF THE INVENTION

Though significant inventive ingenuity, the inventors of the present invention have successfully developed compositions for use as magnetic inks or toners suitable to generate a pigmented magnetic layer upon or integral with a substrate. The compositions comprise magnetic particles that, at least when applied to a substrate, have a surface colour or hue that different to the dark or black colours of many known magnetic materials. Indeed, the compositions of the present invention include magnetic particles comprising a core consisting essentially of a magnetic material, together with a coating on the core that significantly masks the colour of the magnetic material. The resulting compositions may, at least in selected embodiments, be white, substantially white, or coloured, and yet the compositions are highly amenable for deposition to a substrate, to form a magnetic layer. The inventors are unaware of other compositions that exhibit the same whiteness or colour attributes, combined with desirable magnetic properties for use in printing or other deposition to a substrate as a toner.

The magnetic particles of the compositions of the present invention are particles preferably have an average diameter of from 0.1 to 10,000 nm so that there largely fall within the nanometer size range (i.e. they may be considered 'nanoparticles'). The use of such particles presents advantages over micron-sized particles. Such advantages include but are not limited reduced sedimentation of the particles when suspended in a liquid which in turn makes the material more suitable for solution processes such as further modification and subsequent application. The particles comprise a core consisting of, or consisting essentially of, a magnetic substance possibly including a minor quantity of other materials or impurities. Many magnetic materials are known in the art to exhibit black or dark colours, particularly those comprising hard magnetic materials. The particles include at least one coating substantially enveloping the core, that once applied to a substrate to form a layer thereupon, has a colour that is different from that of the magnetic material of the core. For example, the layer may appear at least substantially white in colour or hue, or may have a darker colour. Therefore, in selected embodiments the coating on the particles has a thickness sufficient to substantially obscure any dark or black colour or hue of the magnetic material of the core.

Other coating layers may also be present, either between the core and the substantially white or coloured layer, or enveloping the substantially white or coloured layer, as needed to impart desired surface adhesion or optical properties to the particles. However, such additional coating layers may not necessarily be required to confer desirable colour properties to the particles in the compositions of the invention, nor to the resulting magnetic layers formed upon a substrate. Thus, at least in selected embodiments of the invention, the compositions comprise particles that are very simple in structure, in that they merely comprise a magnetic core and a single coating layer, wherein the single coating layer is sufficient to impart desired colour or visual characteristics to the particles (and specifically the magnetic layer formed by application of the particles to a substrate material) without detracting from the magnetic properties of the particles conferred by the core material. The invention, at least in part, encompasses the realization that such particles are amenable to applications other than, for example, medical therapeutic, diagnostic, or research applications, and may in fact be utilized in the formation of magnetic layers such as for printing purposes through deposition to a substrate.

Unexpectedly, the compositions of the invention exhibit desirable properties when applied to a substrate, for example using known printing or other techniques, to form a high quality and durable magnetic layer. The particles carry sufficient magnetic field intensity for deposition, adherence or fixation to a substrate, and yet their low mass reduces inertia required for deposition. Magnetic layer formation can thus be rapid and efficient. In selected embodiments, the colour or hue of the particles, attributable to the principle coating, make the compositions of the invention suitable for a wide range of printing applications. The particles may be used in their native form, wherein the colour of the particles is attributed to the coating. Such particles may optionally be admixed with other magnetic or non-magnetic inks or coloured particulate materials to provide various other colours or hues. In this way, the compositions of the invention provide an opportunity to alter (e.g. lighten or darken) existing coloured inks or particulate materials, and increase the colour gamut.

In selected embodiments, the compositions of the invention fulfill a need in the printing, ink, and toner industry for lighter colours or substantially white magnetic toners and inks. A single coating may itself be sufficiently opaque to at least substantially conceal a colour of the magnetic core material beneath, and this represents a significant advance in the art. For example, the particles within the compositions of the present invention may have a single coating that is white or which has a light colour, sufficient to mask the darker colour of the magnetic core material. Hence, white, substantially white, or light-coloured magnetic layers may be achieved using the compositions of the present invention, without need for compositions comprising multi-layered particles or other types of particles known in the art, which may be more complex and expensive to manufacture.

In other embodiments, the particles may have a darker coloured rather than a white or substantially white coating to obscure the dark or black colour of the core material, which consists essentially of a magnetic substance. Although selected embodiments described herein refer to compositions or pigments comprising particles with a white or substantially white coating, to give rise to magnetic layers that are white or substantially white in colour, the invention is not limited in this regard. Indeed, the invention encompasses any composition or pigment comprising particles consisting essentially of a magnetic material, coating with a white, substantially white, or darker coloured coating having a sufficient opaqueness or thickness or obscure or substantially obscure a colour of the magnetic material, or a layer disposed immediately beneath said white, substantially white, or coloured layer. The inventors have found that the combined use of such small magnetic core particles, in combination with an obscuring layer, is sufficient to impart extremely desirable properties upon the compositions and pigments of the present invention, to make them highly amenable to a wide range of deposition and printing techniques. The desirable characteristics exhibited by the compositions and pigments of the invention are at least in part attributable to the small size of the particles relative to the strength of their magnetic field intensities.

In one embodiment, the invention provides for a composition for application to a substrate, to generate a pigmented magnetic layer upon and/or integral with said substrate, the composition comprising:

(1) particles each comprising:
  (i) a core consisting essentially of a magnetic material;
  (ii) a coating at least substantially enveloping the core to cause said particles when applied to a substrate to form a pigmented magnetic layer upon the substrate having a colour or hue that is different from that of the magnetic material of the core. In further selected embodiments the coating at least substantially enveloping the core causes said particles when applied to a substrate to form a pigmented magnetic layer having a Hunter Lab colour scale L-value of at least 50, or at least 80, or even at least 95. Whilst simple in nature, such compositions present excellent opportunities for printing and other techniques involving the formation of magnetic, pigmented layers upon a substrate, and yet such compositions are relative simple to manufacture and use. Moreover, the compositions of the present invention permit the formation of excellent pigmented magnetic layers that may be white, substantially white, or light-coloured relative to the particle core material. This important development addresses a long-felt need in the art for useful, and reliable white or near white ink or toner compositions. The inventors have discovered that the compositions disclosed herein, at times comprising particles having just one coating, are suitable for printing applications that require white, near white, or light coloured inks and toners. Surprisingly, the single coating can be sufficient to at least substantially mask the darker colour or hue of the magnetic core material of the particles.

In selected embodiments, one or more additional coating(s) may each be disposed between the core and the coating and/or the additional coating(s) may substantially envelope the white coating, as required to achieve desirable surface colour, reflectance, or other properties or qualities to the particles. In other embodiments, surface coatings may be provided to improve the performance of the particles in suspension, or to improve the flowability of the particles either in dry form, or in suspension.

The compositions of the invention comprising the aforementioned particles may be in dry form, as is typical of many toners in the prior art, or alternatively may be mixed with a liquid phase to form a suspension, or to suspend at least a portion of the particles in the liquid phase. The need for a liquid phase will depend upon the nature and methods for deposition, and the substrate to which the composition will be deposited. Numerous techniques are known in the art for depositing a toner or ink either in dry or liquid suspension form onto a substrate, and it is believed the compositions of the invention are suitable for most if not all such techniques.

Moreover, the particles that are used in the compositions of the present invention may be produced by any suitable method. For example, the core of the particles may be generated by selected granulation techniques, or alternatively from soluble precursors limited in size by growth inhibitors. In the case of soluble precursors, transformation into solid particles material may be achieved, for example, by thermal, sonochemical decomposition, or chemical or electrical reduction. Two illustrative examples of such techniques are illustrated by Burke et al. (2002) Chem. Mater. 14, 4752-4761, and references cited therein, which are incorporated herein by reference. Further illustrative examples of methods for producing coated particles, for use in accordance with the teachings of the present invention, are provided by Burke et al. (2002) Chem. Mater. 14, 4752-4761, and Vestal and Zhang (2003) Nano Letters, 3(12), 1739-1743, which are also incorporated herein by reference. Typically, such techniques for producing coated particles involve reactions in liquid solution or suspension. Other techniques are also known in the art that do not involve liquid solutions or suspensions. Such techniques may involve for example dry deposition of the pigment material, for example by chemical vapour deposition.

The compositions of the invention may further include one or more other magnetic or non-magnetic inks or toners, for example having a colour or hue other than colour or hue of the particles. Admixture of the compositions disclosed herein with other ink or toner compositions, whether in dry particulate or liquid form, may permit the production of magnetic layers having other colour, hue, or reflectance properties. The invention thus encompasses all compositions of the present invention comprising coated particles as previously described, and in addition all admixtures of such coated particles with other ink, dye, diluents, excipients and the like.

The use of white or substantially white particles for the production of the magnetic layers of the invention represents a particularly preferred feature. The particles of the inventive ink and toner compositions preferably include a substantially white coating that is sufficiently opaque to conceal a colour of the magnetic core, or sufficiently opaque to conceal a colour of any additional coating (if present) disposed directly beneath said white coating, at least upon visual inspection of the particles. The invention encompasses the use of particles that include coatings to make them appear white (having an L value of 100 on the Hunter Lab Colour Scheme) as well as those that appear off-white (e.g. having an L value of at least 95 on the Hunter Lab Colour Scheme) or substantially white (e.g. having an L value of at least 70 on the Hunter Lab Colour Scheme), and further those that appear even less white (having an L value of 50-70 on the Hunter Lab Colour Scale). The degree of whiteness imparted to the magnetic particles by virtue of the substantially white coating may thus vary significantly. The invention encompasses compositions comprising particles having at least one coating layer with an L-value of at least 50 on the Hunter Lab Colour Scale, and their use. The invention also encompasses compositions comprising particles having at least one coating layer that, once applied to a substrate to form a magnetic layer thereupon, produce a magnetic layer with an L-value of at least 50 on the Hunter Lab Colour Scale.

The particles may have any irregular shape and form, or alternatively may be substantially spherical. Typically, each particle may have a size range of from 0.1 to 10,000 nm in diameter, preferably 10-80 nm in diameter. The white, substantially white or coloured coating on each particle may have any thickness suitable to impart the desired aesthetic properties to the particles, or to a magnetic layer formed by applying a composition comprising the particles to a substrate. Preferably, the coating has an average thickness of from 1 to 200 nm, more preferably from 5 to 50 nm. Such preferred coating thicknesses appear to give rise to particles having particularly desirable colour and magnetic properties.

The core of each particle may comprise any material that exhibits magnetic properties. Such materials include, but are not limited to, at least one substance selected from the group consisting of: Fe, Ni, Co, a reducible metal oxide, ferrous oxide, nickel oxide, and a ferrite of the formula $MFe_2O_4$ wherein M is a bivalent metal ion or a mixture of bivalent metal ions. Preferably, the core consists of the magnetic material or a mixture of magnetic materials. However, the core may further include minor quantities of other substances or impurities, derived for example from the particle manufacturing process.

The coating substantially enveloping each particle may comprise any substance, mixture, compound, or element that adheres with reasonable efficiency to a magnetic core (or intermediary layer), and which has a degree of whiteness or colour on the Hunter Lab Scale as required. Such materials include, but are not limited to, metal compounds (e.g. silica[$SiO_2$], chalk[calcium carbonate[$CaCO_3$], Titania[titanium dioxide, [$TiO_2$], Zirconia[Zirconium dioxide, $ZrO_2$], baryta[barium sulfate, $BaSO_4$], gypsum[calcium sulfate, $CaSO_4$], powdered glass, zinc oxide[$ZnO$] and zinc sulfide [$ZnS$]), and organic polymers (e.g. optionally functionalized polyisobutylene, optionally functionalized polyethylene, optionally functionalized polystyrene, latex). Other examples of white coating materials may include resins, ceramics etc. Any of these coating materials may be mixed with or replaced by any pigments as described herein or as known in the art.

In selected embodiments, the coating of each particle may comprise a material with a high refractive index, a material with a high hiding power, a material with a high light scattering efficiency, a highly opaque material, a metal oxide, or an organic polymer.

Furthermore, in the compositions of the present invention the liquid phase may comprise any liquid material, or mixtures thereof, suitable to retain the particles in at least partial suspension. The liquid phase may comprise, but is not limited to, any aqueous or organic solvent, wherein the solvent preferably does not corrode or otherwise impede application of the particles to a substrate.

In still further embodiments the invention encompasses the use of the compositions of the invention to generate a pigmented magnetic layer upon or integral with a substrate, for example by depositing the particles of the composition to the substrate. This use extends to any of the compositions of the invention as herein described. In accordance with such uses, a suitable substrate may include any object having any matrix suitable for adhesion thereto of the particles to form the magnetic layer thereupon. For example, substrate materials may be selected from a non-limiting group comprising: paper, plastic, metal, metal alloy, wood, glass, resin, and rubber. In the case of paper, plastic or other materials, the substrate may eventually be intended for use, for example, as a bank note, the magnetic layer providing a security feature to the bank note.

In still further embodiments, the invention provides for a method for generating a pigmented magnetic layer, the method comprising the step of: applying a composition as disclosed herein to a substrate, said particles adhering to the substrate or substrate material, and optionally to one another, thereby to form the pigmented magnetic layer.

The step of applying may involve any type of application method known in the art. For example, the step of applying may involve:

if required, admixing the particles with a liquid to bring the particles into at least partial suspension in the liquid, thereby to form a suspension;

contacting the suspension with the substrate or substrate material, optionally in a presence of a magnetic field;

removing at least a portion of the liquid from the applied suspension; and if required fixing the particles to the substrate.

The step of removing may be an active step, for example involving heating, cooling, suction, microwave exposure etc., or alternatively the step of removing may be passive, for example involving evaporation or capillary action. Therefore, the step of removing may involve any mechanism that ultimately results in a reduction in the presence of the liquid phase of the suspension.

Alternatively, the step of applying may comprise:

contacting the particles in at least substantially dry form with the substrate, optionally in a presence of a magnetic field; and if required fixing the particles to or within the substrate.

Alternatively, the step of applying may comprise:

cross-linking the particles with the substrate, preferably by oxidation or UV cross-linking.

In any method disclosed herein, each step of fixing may involve, for example, heating of the substrate and deposited particles. Other fixing techniques may include, but are not limited to, chemical or electrostatic mechanisms for adhesion of the particles to the substrate. Fixing may induce or improve a degree or strength of adhesion of the particles with the substrate and/or to one another.

In yet further embodiments the invention encompasses a magnetic layer produced by applying a composition as disclosed herein onto a substrate, to cause the particles of the composition to adhere to the substrate and optionally to each other upon the substrate. The magnetic layer of the invention may be produced by applying the composition of the invention to any known method for deposition of magnetic particulate matter. To name just one example, such methods may involve letterpress techniques that are very well known in the art, that utilize inked raised surfaces to create the required image. Many other printing techniques are known in the art, the majority of which will be applicable to the depositing of particles to a substrate in accordance with the teachings of the present invention.

The invention still further encompasses an article comprising a substrate and a pigmented magnetic layer of the invention thereupon. In preferred embodiments the substrate may be a bank-note, and the magnetic layer may provide a security feature for the bank note. For example, the magnetic layer, which may have a colour or hue other than black or dark colours, and may be conveniently and inconspicuously incorporated into the structure, or onto a surface of the bank note.

It should be noted that the magnetic layers of the invention for generating security features on bank notes, are not limited to those having any particular ink or toner colours, or any particular shape, pattern or configuration. Indeed, the bank note security features generated using the magnetic layers of the invention may comprise any conceivable shape, pattern, or configuration, and any conceivable combination of ink or toner colours and hues. For example, the bank note security features may include a specific pattern of magnetic ink only detectable ("readable") by specially pre-configured magnetic signature readers, for example suitable for distribution to retailers. In other embodiments, the bank note security feature comprising the magnetic layers of the invention may comprise multiple colours, or indeed multiple or overlapping layers of the magnetic layers of the invention, thus to provide an even more complex security feature, for example arranged in the form of a coloured picture or simulated photo etc. The colour and/or hues of the compositions used may be adjusted to vary the degree of conspicuity of the security feature on the bank notes.

In still further embodiments the invention encompasses pigments comprising or consisting of any of the compositions or particles disclosed and discussed in the present application. Indeed, the pigments may be white, substantially white, or coloured, depending upon the materials used to coat the particles. The pigments of the invention may be used in dry form or may be admixed with any carriers, diluents or excipient substances as required for a desired pigment application.

Whilst the invention has been described with reference to specific embodiments and examples of the compositions, uses thereof, methods for producing magnetic layers, and magnetic layers themselves of the present invention, a skilled artisan will appreciate that other such compositions, uses thereof, methods for producing magnetic layers, and magnetic layers will reasonably fall within the scope of the invention as herein described and claimed. It is the Applicants intention to include all such further embodiments with the scope of the claims appended hereto.

The invention claimed is:

1. A particulate composition having a Hunter Lab color scale L-value of at least 70 and comprising a plurality of coated magnetic particles, wherein
    each of the particles is configured to comprise a solid core and a solid opaque coating layer,
    the solid core of each coated magnetic particle consists of a solid magnetic material, and
    the solid opaque coating layer of each coated magnetic particle comprises a solid light-scattering material that envelopes the solid core to conceal the solid core or any additional coating layer present beneath the solid opaque coating layer.

2. The composition of claim 1, wherein the composition has a Hunter Lab color scale L-value of at least 80.

3. The composition of claim 2, wherein the composition has a Hunter Lab color scale L-value of at least 95.

4. The composition of claim 1, wherein the discrete, individually coated magnetic particles appear white or substantially white upon visual inspection thereof.

5. The composition of claim 1, wherein the solid core of each coated magnetic particle has a diameter of from 0.1 nm to 10,000 nm.

6. The composition of claim 1, wherein the solid opaque coating layer of each coated magnetic particle has an average thickness of from 1 to 200 nm.

7. The composition of claim 1, wherein the solid magnetic material of the solid core of each coated magnetic particle comprises at least one substance selected from the group consisting of: Fe, Ni, Co, a reducible metal oxide, ferrous oxide, nickel oxide, and a ferrite of the formula $MFe_2O_4$ wherein M is a bivalent metal ion or mixture of bivalent metal ions.

8. The composition of claim 1, wherein the solid opaque coating layer of each coated magnetic particle comprises a metal oxide or a polymer.

9. The composition of claim 8, wherein the metal oxide is selected from at least one of silica, chalk, calcium carbonate, titania, titanium dioxide, zirconia, zirconium dioxide, baryta, barium sulfate, gypsum, calcium sulfate, powdered glass, zinc oxide, and zinc sulfide.

10. The composition of claim 8, wherein the polymer is an organic polymer comprising polyisobutylene, polyethylene, polystyrene, or latex.

11. The composition of claim 1, further comprising an aqueous or organic solvent.

12. A method for generating a pigmented magnetic layer, the method comprising:
    applying the particulate composition of claim 1 to a substrate to form said pigmented magnetic layer, the pigmented magnetic layer having a magnetic field strength that is directly proportional to a quantity of the coated magnetic particles forming the pigmented magnetic layer.

13. The method of claim 12, wherein the applying comprises:
    admixing the coated magnetic particles with a liquid to bring the particles into at least partial suspension in the liquid, thereby to form a suspension;
    contacting the suspension with the substrate in the presence of a magnetic field;
    removing at least a portion of the liquid from the applied suspension; and
    fixing the particles to the substrate.

14. The method of claim 12, wherein the applying comprises:
    contacting the coated magnetic particles with the substrate in the presence of a magnetic field; and
    fixing the particles to or within the substrate.

15. The method of claim 12, wherein the applying comprises:
    cross-linking the particles with the substrate by oxidation or UV cross-linking.

16. A pigmented magnetic layer produced by deposition of the particulate composition of claim 1 to a substrate, the pigmented magnetic layer having a magnetic field strength that is directly proportional to a quantity of the particles forming the pigmented magnetic layer.

17. An article comprising a substrate and the pigmented magnetic layer of claim 16 deposited thereto.

18. The article of claim 17, wherein the article is a bank-note, and the pigmented magnetic layer provides a security feature for the bank note.

19. A security feature for a bank note, the security feature comprising the pigmented magnetic layer of claim 16.

20. The particulate composition of claim 1, wherein each of the coated magnetic particles further comprises one or more additional solid coating layers disposed between said solid core of each of the coated magnetic particles and said solid opaque coating layer of each of the coated magnetic particles and/or at least substantially enveloping said solid core.

21. The particulate composition of claim 1, further comprising a liquid phase to retain said coated magnetic particles at least partially in suspension.

22. The particulate composition of claim 1, further comprising one or more other magnetic or non-magnetic inks or toners.

23. The particulate composition of claim 5, wherein the solid core of each coated magnetic particle has a diameter of from 10 nm to 80 nm.

24. The particulate composition of claim 6, wherein the solid opaque coating layer of each coated magnetic particle has an average thickness of from 5 to 50 nm.

25. A particulate composition comprising a plurality of coated magnetic particles, wherein each of the coated magnetic particles is configured to comprise a solid core and a solid non-magnetic opaque coating layer, the solid core of each coated magnetic particle consisting of a solid magnetic material, and the solid non-magnetic opaque coating layer of each coated magnetic particle comprising a solid light-scattering material that envelopes the solid core to conceal the solid core or any additional coating layer present beneath the solid non-magnetic opaque coating layer; and wherein the particulate composition when applied to a substrate forms a pigmented magnetic layer upon the substrate that appears white or substantially white and has a magnetic field strength that is directly proportional to a quantity of the particles forming the pigmented magnetic layer.

26. The particulate composition of claim 25, wherein each of the coated magnetic particles further comprises one or more additional solid coating layers disposed between said solid core of each of the coated magnetic particles and said solid opaque coating layer of each of the coated magnetic particles and/or at least substantially enveloping said solid core.

27. The particulate composition of claim 25, further comprising a liquid phase to retain said coated particles at least partially in suspension.

28. The particulate composition of claim 25, further comprising one or more other magnetic or non-magnetic inks or toners.

29. A particulate composition having a Hunter Lab color scale L-value of at least 70 and comprising coated magnetic particles, wherein each of the coated magnetic particles is configured to comprise a solid core having a diameter of from 0.1 nm to 10,000 nm and a solid opaque coating layer comprising a metal compound and/or organic polymer, the solid opaque coating layer having an average thickness of from 1 nm to 200 nm;

the solid core of each coated magnetic particle consists of a magnetic material comprising at least one substance selected from Fe, Ni, Co, a reducible metal oxide, ferrous oxide, nickel oxide, and a ferrite of the formula $MFe_2O_4$ wherein M is a bivalent metal ion or a mixture of bivalent metal ions; and the solid opaque coating layer of each coated magnetic particle envelopes the solid core of each coated magnetic particle to conceal the core or any additional coating layer present beneath the solid opaque coating layer.

* * * * *